United States Patent [19]

Clark et al.

[11] Patent Number: 4,532,778
[45] Date of Patent: Aug. 6, 1985

[54] CHEMICAL HEAT PUMP AND CHEMICAL ENERGY STORAGE SYSTEM

[75] Inventors: Edward C. Clark, Woodinville; Douglas D. Huxtable, Bothell, both of Wash.

[73] Assignee: Rocket Research Company, Redmond, Wash.

[21] Appl. No.: 247,004

[22] Filed: Mar. 24, 1981

Related U.S. Application Data

[63] Continuation-in-part of Ser. No. 91,828, Nov. 16, 1979, abandoned.

[51] Int. Cl.³ .............................................. F25B 17/00
[52] U.S. Cl. .................................... 62/477; 62/238.3; 62/235.1; 126/400; 237/2 B
[58] Field of Search ............. 237/2 B; 126/400; 62/476, 477, 494, 480, 235.1, 238.3, 112

[56] References Cited

U.S. PATENT DOCUMENTS

| | | | |
|---|---|---|---|
| 1,669,269 | 5/1928 | Von Platen et al. | 62/494 |
| 1,729,081 | 9/1929 | Miller | 62/480 |
| 3,473,347 | 10/1969 | Andrews et al. | 62/476 |
| 3,561,227 | 2/1971 | Swearingen | 62/476 |
| 4,285,209 | 8/1981 | Luthi et al. | 62/112 |
| 4,314,668 | 2/1982 | Jansen | 62/238.3 |
| 4,333,515 | 6/1982 | Wilkinson et al. | 165/1 |

FOREIGN PATENT DOCUMENTS 276379 7/1930 Italy ............................ 62/476

OTHER PUBLICATIONS

Clark et al., "Development Status and Utility of the Sulfuric Acid Chemical Heat Pump/Chemical Storage System", Energy Conversion Engineering Conference, Aug. 18–22, 1980.
Clark et al., "Sulfuric Acid–Water Heat Pump/Energy Storage System Demonstration, ASME Energy Storage Session, Dec. 1978.
Huxtable et al., "Thermal Energy Storage by Sulfuric Acid–Water System", International Solar Energy Society Meeting, vol. 8, pp. 178–191, 1976.
Smith, Storage in Solar Energy Systems, International Solar Energy Society, UK Section, Feb. 1978.
Hiller et al., Chemical Heat Pump/Energy Storage System Demonstration Using Sulfuric Acid and Water, Proceedings of Solar Energy Storage Options Conference, San Antonio, Texas, Mar. 19–20, 1979, pp. 441–454.
Sundahl, R. O. et al., Temperature Boosting & Energy Storage by Heat of Dilution, Sandia Laboratories, Livermore, Report SLL-74-0224, May 1974.

*Primary Examiner*—Henry Bennett
*Attorney, Agent, or Firm*—Christensen, O'Connor, Johnson & Kindness

[57] ABSTRACT

A chemical heat pump and storage system employs sulfuric acid and water. In one form, the system includes a generator and condenser, an evaporator and absorber, aqueous acid solution storage and water storage. During a charging cycle, heat is provided to the generator from a heat source to concentrate the acid solution while heat is removed from the condenser to condense the water vapor produced in the generator. Water is then stored in the storage tank. Heat is thus stored in the form of chemical energy in the concentrated acid. The heat removed from the water vapor can be supplied to a heat load of proper temperature or can be rejected. During a discharge cycle, water in the evaporator is supplied with heat to generate water vapor, which is transmitted to the absorber where it is condensed and absorbed into the concentrated acid. Both heats of dilution and condensation of water are removed from the thus diluted acid. During the discharge cycle the system functions as a heat pump in which heat is added to the system at a low temperature and removed from the system at a high temperature. The diluted acid is stored in an acid storage tank or is routed directly to the generator for reconcentration. The generator, condenser, evaporator, and absorber all are operated under pressure conditions specified by the desired temperature levels for a given application. The storage tanks, however, can be maintained at or near ambient pressure conditions. In another form, the heat pump system is employed to provide usable heat from waste process heat by upgrading the temperature of the waste heat.

21 Claims, 4 Drawing Figures

CHEMICAL HEAT PUMP AND CHEMICAL ENERGY STORAGE SYSTEM

The government of the United States has rights in this invention pursuant to Department of Energy Contract No. EY-765-C-03-1185.

RELATED APPLICATIONS

This application is a continuation-in-part of prior copending application, Ser. No. 091,828, filed Nov. 16, 1979 now abandon, the benefit of the filing date of which is hereby claimed under 35 USC 120.

BACKGROUND OF THE INVENTION

The present invention relates to energy storage and heat pump systems, and more particularly to chemical heat pump and storage systems employing sulfuric acid and water solutions as the heat transfer and storage media.

Currently usable energy resources and current energy utilization rates dictate a hiatus between resources and utilization that will occur sometime after the year 2000 unless alternate energy resources are developed and made commercially viable and current resources are conserved. Coal, oil shale, nuclear and solar power, and industrial waste heat are presently considered to be the major incompletely developed energy sources. Although coal, shale and nuclear power can be, in essence, stored and utilized upon demand, solar energy, off-peak utilization electrical energy, and industrial waste heat are abundant energy sources that are only cyclically available and in essence require storage. For example, when solar energy is available, typically the demand for energy is low. Conversely, when the peak demand occurs, especially in residential and commercial applications, solar energy is not available.

Electrical energy is one of the conversion forms of energy that is most readily available from all of the various aforementioned energy sources. However, electrical energy too is very difficult to store in a confined space and in an economical manner. About the only means of presently storing electrical energy is in chemical storage batteries. Such batteries are large, bulky and relatively inefficient in their storage capability. Thus, they have a very low storage density. Another means of storing energy is in the form of heat. Various means of storing heat have been tried, including the addition of heat to liquids and/or solids that are confined by insulated or noninsulated containers. Such storage means have included large water tanks and large rock beds to which heat is transferred and stored in the form of sensible heat. These prior art methods, however, require large volumes of storage space and are thus relatively inefficient because they have a low storage density.

It is one broad object of the present invention to provide a means for storing heat energy, and more particularly to provide means for storing heat energy in an economical, efficient and high-density manner. It is a further broad object of the present invention to provide a means for pumping heat from a low-temperature source to a higher temperature at which it can be utilized. It is a further object of the present invention to combine a means for storing energy and for pumping heat. It is a further object of the present invention to provide a chemical heat pump and energy storage systems that occupy very little space, that present very little risk of contamination of the environment surrounding the systems, that are economical and relatively efficient to operate, and that are capable of operating for many years without major service efforts.

SUMMARY OF THE INVENTION

In accordance with the foregoing objects and other objects that will become apparent to one of ordinary skill in the art, the present invention provides energy storage and heat pump systems employing sulfuric acid and water as the chemical heat storage and transfer media. The basic energy storage system has a first container means for holding the aqueous sulfuric acid solution. The upper portion of the first container means includes means for providing a large liquid vapor surface contact area. A second container means is provided for holding water. A conduit means places the first and second container means in water vapor communication. The region enclosed by the first and second container means and the conduit means are maintained under a partial vacuum, preferably at the vapor pressure of water at given operating temperatures. All gases except water vapor are also evacuated from the first and second container means and conduit means. A first heat transfer means is provided for supplying heat to and removing heat from the acid solution in the first container means. A second heat transfer means is also provided for supplying heat to and removing heat from the water in the second container means.

When charging the system, heat is supplied to the first container means to generate water vapor, which is transferred to the second container means where heat is extracted to condense the water vapor. The extracted heat can be supplied to a heating load or dumped in an ambient heat sink. When discharging the system, heat is supplied to the second container means to evaporate water. The water vapor is transferred through the conduit means to the first container means where it is condensed and absorbed into the acid solution. The latent heat of condensation and heat of dilution are extracted from the first container means and supplied to a heating load or dumped in an ambient heat sink. The nature of the system allows heat to be pumped from a low-temperature source, such as ambient air or a building cooling load to the higher temperature at which the water vapor is condensed and absorbed. A recirculation means can be operably associated with the first container means to supply liquid to the means for providing a large contact area so that the water vapor can more readily be reabsorbed into the acid solution. Preferably, the means for providing a large contact area comprises packing such as conventional distillation column packing.

In one operational embodiment of the invention for use with a heating and air conditioning system, the first container means is separated into three discrete compartments: an absorber; an acid storage tank; and a generator. Similarly, the second container means is separated into three discrete compartments: a condenser; a water storage tank; and an evaporator. The generator and condenser are coupled in vapor communication by a conduit means. Similarly, the evaporator and absorber are coupled in vapor communication by a conduit means. While the generator/condenser and evaporator/absorber portions of the apparatus are maintained under pressure or vacuum conditions, depending upon the primary energy source temperature and upon the evaporating and condensing temperature, both storage tanks can be maintained at or near atmospheric pressure. As a consequence, the size of the equipment that must be maintained under other than atmospheric pressure conditions is kept at a minimum, thus reducing the complexity and cost of the system.

In a second operational embodiment of the invention for using waste heat from an industrial process to produce usable heat at a higher temperature than the waste heat, the first container means is separated into only two compartments, an absorber and a generator. Similarly, the second container means is separated into two compartments, a condenser and an evaporator. The generator and condenser are again coupled in vapor communication by conduit means while the evaporator and absorber are similarly coupled in vapor communication by conduit means. Diluted acid from the absorber is circulated to the generator while concentrated acid from the generator is recirculated to the absorber. Waste heat at a first temperature is supplied to the evaporator and preferably to the concentrated acid solution as it is being recirculated to the absorber. Heat from the condenser is rejected to a low-temperature heat sink such as the ground, or ground water. Heat at an elevated temperature for use in further industrial processing is removed from the diluted acid as it is circulated to the generator. By utilization of this system, referred to herein as an industrial chemical heat pump, heat that would otherwise be rejected to the environment can be upgraded to a temperature sufficiently high so that the heat can be feasibly used in industrial processing.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 1:
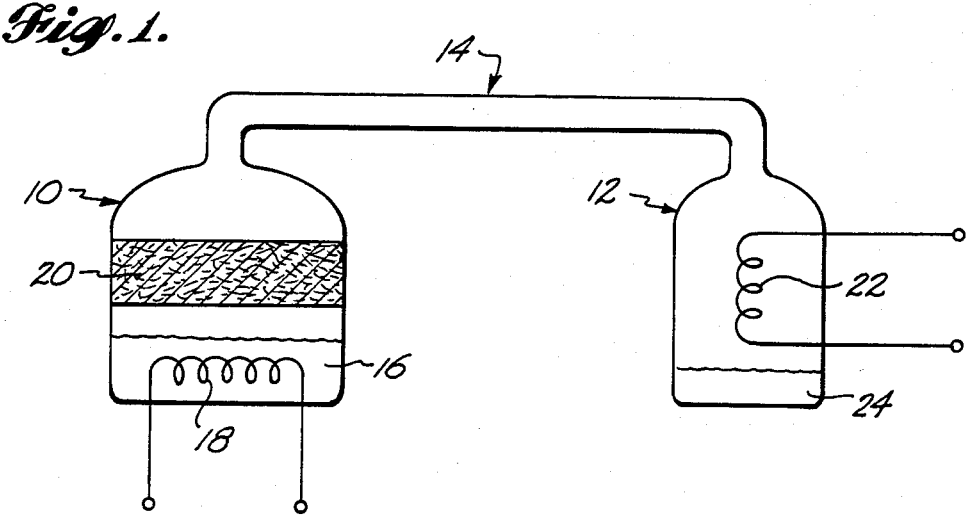
FIG. 1 is a schematic diagram of the chemical heat pump and energy storage system of the present invention shown in a charging mode of operation wherein heat is added to and stored within the system.

The chemical heat pump and thermal energy storage system of the present invention employs sulfuric acid and water as the liquid chemical components of the system. These chemicals are chosen for several reasons including the relatively low cost of each of the materials, the relatively ready availability, easy separability, the relatively high latent heat of evaporation of water, the low vapor pressure of sulfuric acid, and the relatively high heat of dilution of the sulfuric acid-water system. Of course, it is apparent that water is relatively low in cost and readily available. What may not be apparent is that sulfuric acid is one of the least expensive industrial chemicals that exists today. In fact, the advent of scrubbing systems for waste gas exhaust stacks for industrial processes produces such an abundance of sulfuric acid byproduct that new uses for the acid are being constantly sought.

The chemical heat pumping and energy storage system is disclosed below first in relation to its application for heating and/or cooling a residential or commercial building. This application represents only one of many potential uses for the sulfuric acid/water heat pump system. As is apparent to one of ordinary skill in the art, the system of the invention is not limited thermodynamically to the temperatures and pressures specified below. In fact, other applications for industrial processes, for example, could employ components similar to those described below, but designed for higher or lower temperatures as limited by the critical point of water and the freezing point of aqueous sulfuric acid solutions.

The system of the present invention regardless of its particular application basically has two operational modes: a charging cycle during which heat is added to and stored in the system; and a discharge cycle during which heat is pumped from a low-temperature reservoir to a higher temperature at which heat is extracted from the system. In the charging cycle, heat is added to a relatively diluted aqueous sulfuric acid solution to drive off water vapor from the solution, concentrating the sulfuric acid content of the solution. The water vapor is transferred through a closed vapor passage from which are evacuated all other gases, to a condenser where heat is taken from the water vapor, thus condensing it to liquid water. When the system is to be applied to a building heating and/or cooling load, the charging cycle of the system is conducted at a low pressure on the order of 1.0 p.s.i.a., although the system is operable at pressures in the range of from $10^{-7}$ p.s.i.a. to $3.2 \times 10^3$ p.s.i.a. Utilization of relatively low pressures allows the temperatures at which the sulfuric acid can be concentrated and the water condensed to be relatively low. For example, at 1.0 p.s.i.a. the aqueous acid can be concentrated to 98% by weight acid at temperatures on the order of 440° F. Similarly, the water can be condensed at relatively low temperatures on the order of 100° F. when operating in the foregoing concentration temperatures.

On reversing the cycle to discharge the system, heat is supplied to water that is in vapor communication with concentrated sulfuric acid. The pressures employed on the discharge cycle are usually lower than during the charge cycle and are on the order of 0.2 p.s.i.a., that is, a nearly complete vacuum. Again, all gases other than water vapor have also been evacuated from the system. In this manner, heat can be supplied to liquid water at temperatures on the order of, for example, 50° F. to 75° F. to evaporate the water and transfer the resulting vapor through the vapor passage to the concentrated sulfuric acid. Upon recombination with the sulfuric acid, that is, absorption by the sulfuric acid, the latent heat of dilution as well as the heat of condensation is released. The released heat can be recovered from the diluted sulfuric acid solution at temperatures significantly higher than that of the evaporating water side of the system. Thus, this heat can be employed to satisfy a heating load, for example, during periods when a primary energy source is unavailable.

For a better understanding of the heat pump of the present invention in the context of its application to a building heating and cooling load, refer to FIG. 1 in which is depicted in schematic form an acid container that functions as a generator 10 and a water container that functions as a condenser 12. The upper portions of the generator 10 and the condenser 12 are placed in mutual vapor communication via a conduit 14. Air and any trace gases are evacuated from the generator, condenser and conduit to leave the system under a partial vacuum of on the order of 0.1 p.s.i.a to 2.0 p.s.i.a. A dilute sulfuric acid solution 16 is present in the generator 10. Preferably, the minimum acid concentration is on the order of 63% by weight acid based on the total acid and water present. Heat is supplied to the dilute sulfuric acid 16 via a heat exchanger 18. The heat supplied to the heat exchanger 18 comes from a primary energy source, such as a solar collector, that gathers solar energy during periods of sunlight and converts the solar energy to heat, which in turn is used to heat a heat transfer medium to temperatures on the order of 80° F. to 500° F. The upper portion of the generator 10 carries packing 20, that serves to collect any sulfuric acid vapors that are entrained by the water vapor as it is evaporated from the dilute sulfuric acid solution 16. At the same time heat is added to the acid solution, heat is extracted from the condenser 12 via heat exchanger 22 to condense the water and reduce the vapor pressure of water in the condenser 12 to a level lower than the vapor pressure of water in the generator 10. Thus, a driving force is created to cause the water vapor to travel through the conduit 14 and be condensed in condenser 12 and stored as liquid water 24. The heat extracted from the condenser is dumped to either an ambient heat sink, or preferably during appropriate operating conditions, is supplied to satisfy, for example, a building heating load. The charging process continues until the acid solution is fully concentrated and approaches the maximum temperature of the heat source.

Figure 2:
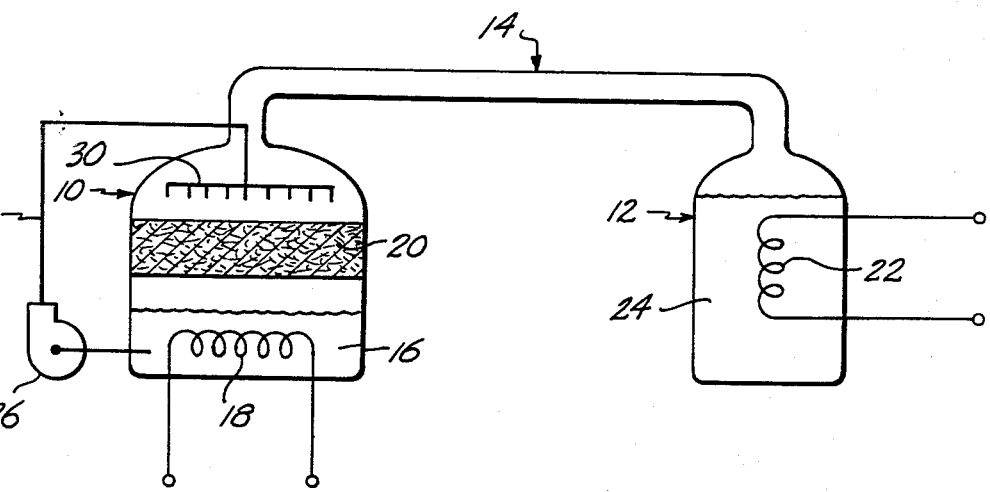
FIG. 2 is a schematic diagram of the chemical heat pump and energy storage system of the present invention showing the system in a discharging mode of operation wherein heat is removed from the system and heat is pumped from a low-temperature source to a high-temperature reservoir.

Referring now to FIG. 2, a schematic form of the apparatus being operated in the heat pumping, discharge mode of operation is illustrated. In this mode, the function of the condenser 12 is reversed to that of an evaporator. Heat is supplied to the evaporator via the heat exchanger 22 from a heat source such as ambient air, ground water, or a building cooling load. The water vapor produced from the water 24 in the condenser/evaporator 12 travels through the conduit 14 to the generator 10 which now functions as an absorber. In this mode of operation, the concentrated acid 16 is pumped via a pump 26 and associated piping 28 to a distribution system 30 such as a spray bar, perforated tray, or the like. The concentrated acid 16 is distributed over the packing 20 to provide a large liquid contact area for the water vapor arriving at the generator/absorber 10 from conduit 14. As the water vapor contacts the concentrated acid on the packing 20, it condenses and is absorbed into the acid, releasing the heat of condensation and additionally, the heat of dilution. In this manner, the temperature of the sulfuric acid being diluted in the generator/absorber 10 is raised to relatively high temperatures. Heat is extracted from the generator/absorber 10 via the heat exchanger 18 and is employed, for example, to satisfy the heating load of a building during hours when, for example, solar energy is not available.

In the thus completed charging and discharging cycles of the system, heat is added to, stored in and extracted from the system. If the heat of condensation is employed, for example to heat a building, the coefficient of performance (COP) will be greater than the COP if the heat of condensation is merely dumped to the atmosphere or to another heat sink. For example, where the heat of condensation is used, the COP can be calculated by the formula:

$$COP = \frac{Q_{out} + Q_{cond}}{Q_{in} + W_{parasitic}}$$

wherein:
$Q_{out}$ = the total heat removed from the system during discharge;
$Q_{in}$ = the total heat input into the system during charge;
$W_{parasitic}$ = three times the parasitic work; and
$Q_{cond}$ = the energy removed from the condensing vapor in the water tank during charging and used for heating.

Calculations indicate that a theoretical COP as high as 1.7 can be obtained when the heat of condensation is used. Where the heat of condensation is not used, the COP is calculated by the formula:

$$COP = \frac{Q_{out}}{Q_{in} + W_{parasitic}}$$

Utilizing this formula, the COP drops to a theoretical level of 1.0 or slightly lower. Thus, the average COP for heating with a seasonal acid storage system, such as very simply described in conjunction with FIG. 1, will range between the limits of 1.0 to 1.7.

On the other hand, the energy storage density of the system on a yearly average will increase correspondingly as the COP decreases. The energy storage density of the sulfuric acid/water system is a function of the maximum acid concentration during charging and the minimum acid concentration upon discharging. Both the maximum and minimum acid concentrations are a function of the heat source and heat sink temperatures. For a given heat input temperature during charging, a higher condensing temperature will reduce the maximum acid concentration achieved, thus lowering the energy storage density. During discharging, lowering the heat source (low side) temperature will decrease the energy storage density by limiting the amount of acid dilution. If the source temperature during discharging falls below the saturation temperature of the water dictated by the acid temperature, heat pumping will cease.

To illustrate these conditions and limitations, heating energy storage densities are shown in Table I below as a function of heat input temperature where the heat delivery temperature on discharge is 100° F. and where the heat source temperature on discharge and the heat sink temperature on charge are 45° F. The data in the table ranges from a minimum acid concentration of 63% by weight sulfuric acid to a maximum acid concentration of 98% by weight. Additionally, the calculated data is based on the assumptions that the system is discharged from the peak acid concentration to 63% by weight sulfuric acid and that the heat of condensation of water during charging is discarded. The energy densities given in the table in Btu's per cubic foot are based on initial volumes of water plus acid at indicated peak concentrations.

TABLE I

| Performance Estimates on Heating | | | | | |
|---|---|---|---|---|---|
| Peak Acid Concentration (% $H_2SO_4$) | 63 | 70 | 80 | 90 | 98 |
| Required charging | 115 | 140 | 200 | 280 | 370 |

TABLE I-continued

| Performance Estimates on Heating | | | | | |
|---|---|---|---|---|---|
| temp (°F.) | | | | | |
| Energy density (Btu/lbm dilute) | — | 120 | 290 | 440 | 540 |
| Energy density (Bty/ft³) | — | 11,700 | 27,000 | 39,900 | 47,400 |
| COP heating | — | 1.0 | 1.0 | 1.0 | 1.0 |

Since the heat rejected during the charge mode has not been used for space heating, the maximum theoretical COP under these assumptions is 1.0. For a heat input of 280° F. that, for example, would be available from an evacuated tube solar collector, the usable energy storage density is 440 Btu/lbm of dilute 63% by weight acid solution.

On the other hand, as indicated above, the COP can be increased to a theoretical value of about 1.7 if the heat of condensation is also used for heating a building load. Table II shows the heating energy storage densities as a function of heat input temperature. The calculations of Table II are based on a heat delivery temperature on discharge of 100° F., a heat source temperature on discharge of 45° F., and a heat sink temperature on charge of 100° F. Again, it is assumed that the system is discharged to an acid concentration of 63 weight percent sulfuric acid. Again, the energy densities given in Btu's per cubic foot are based on initial volumes of water plus acid at indicated peak concentrations.

TABLE II

| Performance Estimates on Heating | | | | | |
|---|---|---|---|---|---|
| Peak Acid Concentration (% H₂SO₄) | 63 | 70 | 80 | 83.5 | 90 |
| Required charging temp (°F.) | 170 | 200 | 260 | 280 | 335 |
| Energy density (Btu/lbm dilute) | — | 120 | 290 | 340 | 440 |
| Energy density (Btu/ft³) | — | 11,700 | 27,000 | 31,800 | 39,900 |
| COP heating | — | 1.84 | 1.76 | 1.74 | 1.71 |

Thus, for comparison to the data tabulated in Table I, for a heat input temperature of 280° F., the energy storage density is 340 Btu/lbm of dilute (63% by weight) acid. For the same heat input temperature (280° F.) the COP is 1.74. Thus, it is apparent that there is a trade-off between COP and energy density storage. It should be recognized however, that in the case of seasonal storage, much of the energy will be stored when there is neither a heating nor cooling demand, and thus a higher energy storage density will be realized.

Comparing the energy storage density of 340 Btu/lbm dilute (31,800) Btu/ft³) with sensible heat storage in water between 280° F. and 100° F. (180 Btu/lbm or 11,000 Btu/ft³), it is understood that not only is the energy storage density of the acid system almost twice that of water on a mass basis and three times greater on a volume basis, but also that 40% fewer solar collectors are required compared to a water system because of the COP of 1.7. These features, coupled with an efficient long-term storage capability, and further reductions in collector requirements, as are discussed below, make sulfuric acid heat pump/storage systems extremely attractive for solar heating and cooling.

Similar advantages exist for application of the sulfuric acid system to off-peak air conditioning. A peak acid concentration of 98% can be readily achieved using electric resistance heat input. Thus, assuming a low side temperature of roughly 40° F., and a heat rejection temperature of 100° F., the cooling energy storage density would be roughly 390 Btu/lbm dilute (34,400 Btu/ft³ total volume of water and 98% acid) while the theoretical COP on cooling would be approximately 0.7. By comparison, the energy density of ice storage is roughly 150 Btu/lbm or 8,600 Btu/ft³. Thus, the mass energy density of the sulfuric acid system is 2.6 times greater than that of the ice system, and the volumetric energy density is over four times greater. Ice storage systems typically also must have very large heat exchangers because of the low thermal conductance of the ice. The latter not only increases the required ice tank size by a considerable fraction, but also results in high costs. No ice is formed in the sulfuric acid system and, hence, the heat exchanger size is much smaller; and costs should be much less.

Figure 3:
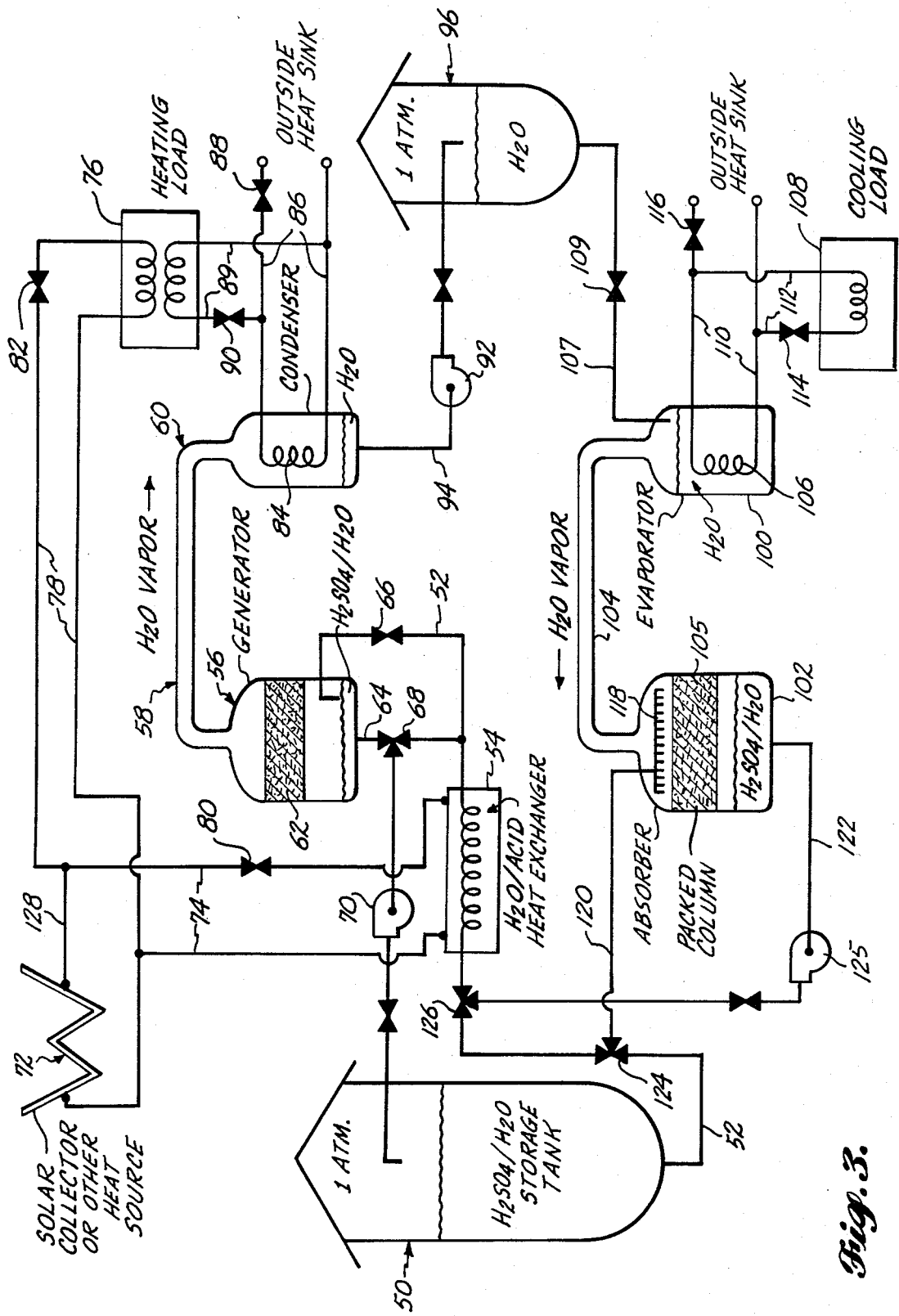
FIG. 3 is a schematic diagram of a chemical heat pump and energy storage system constructed in accordance with the present invention for use in a heating and air conditioning application.

Turning now to the schematic diagram of FIG. 3, a complete operating system of the type that is suitable for use in domestic and commercial heating and air conditioning applications employing the chemical heat pump and energy storage system of the present invention is illustrated. In this system, acid and water are stored at ambient pressure conditions while operating the charging and discharging cycles as discussed above under vacuum conditions. Concentrated sulfuric acid is stored in storage tank 50. In actual practice, tank 50 can be located underground. Fluid line 52 couples the bottom of the acid storage tank through the acid heat exchanger 54 to the generator 56. The generator is coupled via vapor conduit 58 to the condenser 60. The acid heat exchanger 54 is external of the generator 56 in this embodiment of the invention, although it could be internal to the generator and absorber as discussed in conjunction with FIGS. 1 and 2. Similar to the generator described above, the generator of this embodiment does carry a packed column 62 to collect any acid vapor being carried over into conduit 58 with the water vapor. Concentrated acid is returned from the generator 56 via fluid line 64 through three-way valve 68 and pump 70. Because the generator 56, conduit 58, and condenser 60 are maintained under vacuum conditions, the pump 70 is required to pump the liquid from vacuum conditions back to ambient pressure. No pump, however, is needed to transfer concentrated acid through fluid line 52 to the generator 46 as the pressure drop from the storage tank to the condenser is an adequate driving force. Thus, the flow into the generator 56 through fluid line 52 is controlled by valve 66.

Heat is supplied to acid heat exchanger 54 from the primary energy source, for example, solar collector 72. The solar collector 72 can be of conventional design and be chosen to provide the appropriate heating temperatures to concentrate the acid to a desired peak value. Heat transfer medium from the solar collector is transferred via lines 74 to the acid heat exchanger 54. If conditions are favorable, or the chemical energy storage system is completely charged, the heat from the solar collector can be used solely or conjunctively to supply heat to a building heating load represented by block diagram 76. The heat transfer medium from the solar collector 72 can be transferred via lines 78 which are coupled to and parallel with lines 74. If, for example, it is desired to transfer the entire heat output of the solar collector to the building heating load 76, a valve 80 in one of the lines 74 is closed. Alternatively, if it is desired to transfer the full heat output of the solar collector to the acid heat exchanger 54, a valve 82 in one of the lines 78 is closed. Of course, the valves 80 and 82 can be adjusted to proportion the heat transfer medium from the solar collector between the building heating load 76 and the acid heat exchanger 54.

The water vapor from the generator 56 travels to the condenser 60 where heat is withdrawn by a heat transfer medium being circulated through the condenser heat exchanger 84. The heat transfer medium in the condenser 84 is transferred via conduits 86 to an outside heat sink during a summer charging cycle, that is, when there is no building heating load. On the other hand, during a winter charging cycle, a valve in one of the conduits 86 is closed and the heat transfer medium is circulated to a building heating load via conduits 89 coupled in parallel with conduits 84. Conduits 88 also carry valve 90 in series to cease flow of the heat transfer medium through the building heating load during a summer charging cycle. The condensed water from the condenser 60 is transferred by the pump 92 through lines 94 up to a one-atmosphere storage tank 96.

The storage and heat pump system schematically illustrated in FIG. 3 is discharged in a manner very similar to that of the simplified system described in conjunction with FIG. 2. In this system, however, the evaporator 100 and absorber 102 are separate from the generator 56 and condenser 60. The evaporator 100 is coupled in vapor communication with the absorber 102 via vapor conduit 104. Again, the evaporator, conduit 104, and absorber 102 are operated under vacuum conditions. The upper portion of the absorber 102 carries a packed column 105 similar to the generator.

To initiate the discharge cycle, water is drawn from the storage tank 96 into the evaporator 100 via fluid line 107. The water flow into the evaporator is regulated by valve 109. Heat is supplied to the evaporator 100 via heat exchanger 106. The heat transfer fluid circulated through the heat exchanger 106 obtains heat from several sources, among which are an ambient heat source, or a building cooling load represented schematically by rectangle 108. Heat transfer fluid is circulated via conduits 110 to the ambient heat source. Conduits 112 circulate the heat transfer fluid to the building cooling load 108. When the heat transfer fluid is being circulated to the outside heat source, valve 114 in one of the lines 112 is closed. Conversely, when the heat transfer fluid is being circulated to the building cooling load, valve 116 in one of the lines 110 is closed.

The water vapor generated in the evaporator 100 travels through the vapor circuit 104. Concentrated sulfuric acid from the acid storage tank 50 is conveyed to an acid distribution system 118 via fluid line 120. Line 120 is coupled to a three-way proportioning valve 124 interposed in line 52 between the acid storage tank 50 and the acid heat exchanger 54. The flow of acid from the acid storage tank down to the vacuum conditions in the absorber 102 is controlled by appropriately adjusting the valve 124. The acid is distributed over the packing 105 in the packed column, which provides a relatively large liquid-vapor contact interface so that the vapor entering the absorber from conduit 104 is readily absorbed into the concentrated acid. The heat generated during the absorption process, both from the heat of dilution and from the heat of condensation, is retained by the hot diluted acid, which drops to the bottom of the absorber 102, from whence it is pumped via fluid lines 122 by pump 125 to three-way valve 126. The three-way valve 126 is located in line 52 downstream of valve 124 but upstream of the acid heat exchanger 54.

During a winter discharge cycle, the hot acid is circulated via valve 126 through the acid heat exchanger 54 giving up its heat to the heat transfer fluid being circulated through conduits 74 and 78. In this mode of operation, valves 80 and 82 are open allowing the heat transfer fluid to be circulated to the building heating load 76. Of course, the valve 128 adjacent the solar collector is closed to prevent heat transfer fluid from being circulated in a reverse direction through the collector. When there is no building heating load, for example during a summer discharging cycle, the heat added to the dilute acid is combined with heat from the solar collector to further heat the acid and thus expedite the reconcentrating process in the generator 56.

The embodiment of the chemical heat and energy storage system of the present invention as depicted schematically in FIG. 3 has several advantages over that of a simple system. First, the system can be charged and discharged simultaneously. Additionally, the containers required for the generator, condenser, evaporator, and absorber can be relatively small as compared to the storage capacity of the entire system. Since these four portions of the system must be operated under a vacuum, and since the generator and absorber must withstand high temperatures and must be resistant to acid attack, the need only for small containers for these portions of the system will reduce the overall cost of the system. The bulk of the water and acid can be stored in conventional, less expensive containers at one atmosphere. By pumping liquid water from the condenser and liquid acid from both the absorber and generator by liquid pumps back up to one atmosphere when they are being returned to the storage systems, the generator, condenser, evaporator and absorber can always be maintained under vacuum conditions. Thus. the system need not be evacuated at the beginning of each operational cycle. In this manner, the parasitic work necessary to operate the charge and discharge cycles is minimized.

Figure 4:
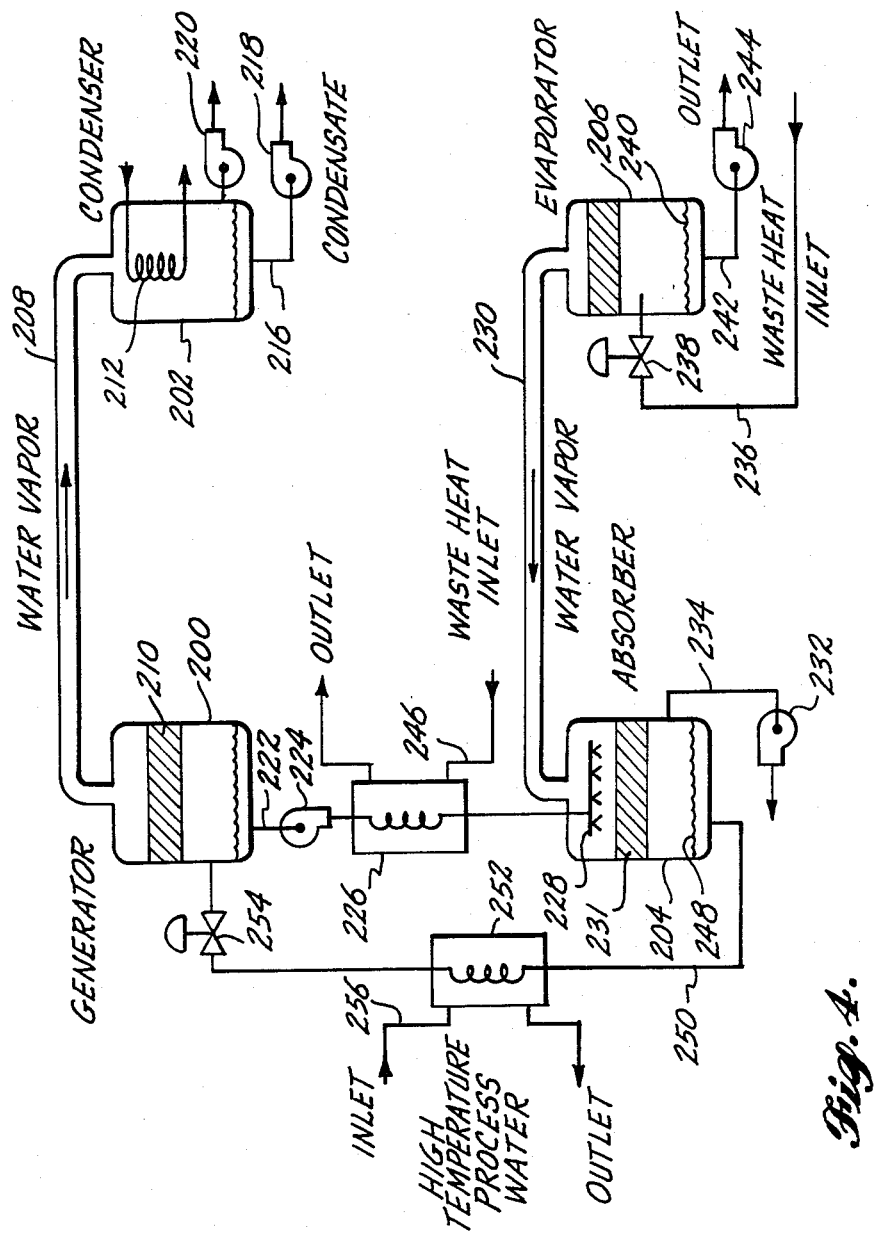
FIG. 4 is a schematic diagram of an industrial chemical heat pump for upgrading waste heat from an industrial process.

Referring now to FIG. 4, another embodiment of the invention in the form of an industrial chemical heat pump can be employed to upgrade waste heat that is otherwise rejected to the atmosphere by increasing the temperature of the waste heat so that it can be economically and feasibly used in additional processing applications. When used as an industrial chemical heat pump, the system employs four basic components, a generator 200, a condenser 202, an absorber 204, and an evaporator 206. The generator and condenser are coupled by a vapor conduit 208, maintaining the two in vapor communication. A packed column 210 or other surface area-increasing bed is situated in the upper portion of the generator. The packed column 110 functions basically as a liquid vapor separator to prevent sulfuric acid from being carried over through conduit 208 into the condenser 202.

As in the prior embodiment, an aqueous sulfuric acid solution is concentrated in the generator by vaporizing water in the solution and condensing it in the condenser 202. In this embodiment, low-temperature water is fed to the condenser heat exchanger 212. The low-temperature water, in the range of 40° F. to 70° F. for example, condenses the water vapor entering the condenser from the conduit 208 into liquid water. The liquid water is collected at the bottom of the condenser and removed via line 216 through liquid pump 218. A vacuum pump 220 is also coupled to the vapor-containing region of the condenser to maintain the pressure in the coupled generator/condenser system at a predetermined operating pressure preferably under at least a partial vacuum. Concentrated sulfuric acid from the generator is pumped by liquid pump 224 via line 222 through heat exchanger 226 to the absorber 204. The concentrated sulfuric acid is distributed by a spray bar 228 over a packed column 231 in the absorber 204. Water vapor produced in the evaporater 206 is carried through vapor conduit 230 to the absorber where it is contacted with the concentrated sulfuric acid in the packed column 231. A predetermined operating pressure dependent on the temperature of the reject heat is maintained in the coupled absorber/evaporator system. The vacuum pump 232 connected via line 234 to a vapor-containing region of the absorber is used in those cases where the absorber/evaporator pressure is less than atmospheric (that is, where the water vapor temperature is less than 212° F.).

In this embodiment of the invention, waste heat from an industrial process is injected into the chemical heat pump system at two locations, the evaporator 206 and the concentrated sulfuric acid heat exchanger 226. In the particular embodiment shown, the waste heat is supplied to the evaporator in the form of hot water or low-quality steam via line 236. The water or steam is throttled via valve 238 and flashed into the evaporator, thus producing the water vapor that is carried from the evaporator through the vapor conduit 230 to the absorber 204. Liquid water 240 is collected at the bottom of the evaporator 206 and removed via line 242 by liquid pump 244. Waste heat is also supplied via line 246 to the heat exchanger 226 to heat the concentrated sulfuric acid being circulated to the absorber 204.

The water vapor entering the absorber 204 from the evaporator 206 condenses and is absorbed into the concentrated sulfuric acid exiting from spray bar 228 and packed column 231 producing a temperature higher than the temperature of the waste heat source. The heated, diluted acid 248 is collected at the bottom of the absorber and recirculated via line 250 through a heat exchanger 252 back to the generator 200 where it is throttled through valve 254 to flash off water vapor and reconcentrate the acid. When the dilute acid is throttled as it enters the generator, it gives off an equal amount of water vapor per unit of time as transferred to the acid in the absorber. The heat supplied to the concentrated acid in the heat exchanger 226 makes up for the energy lost in the generator-throttling process before the reconcentrated acid enters the absorber. Heat is removed from the diluted sulfuric acid in the heat exchanger 252 and transferred to another heat transfer medium being circulated through line 256 into and out of the heat exchanger 252. The fluid temperature of the heat transfer medium at the process water outlet from the heat exchanger 252 is at a temperature higher than the waste heat source temperature and can be utilized for further industrial processing. For example, heat can be removed from the diluted acid and supplied to a new process at temperatures of 150° F. and 380° F. with respective waste heat input temperatures of 130° F. and 250° F.

This embodiment of the industrial chemical heat pump has a unique cost-effective design feature. No heat exchanger is required in the evaporator since water is both the heat pump working fluid and the waste heat source. However, since the waste heat source, warm water or low-quality steam, is flashed directly into the evaporator, the source water of steam should preferably be free of chemicals having vapor pressures higher than water. Other nonvolatiles can, of course, be present without harm to the system, providing corrosion-resistant materials are used as required and solids are filtered from the system.

The performance of the industrial chemical heat pump is typically defined as an electrical coefficient of performance ($COP_e$) rather than the total energy version discussed earlier. Essentially, the heat extracted from the waste energy source is considered "free" heat since it would normally be rejected. The parasitic work required to drive the equipment is converted directly to thermal units without the three-to-one electric power conversion efficiency. Therefore, $COP_e$ is defined as:

$$COP = Q_{out}/W_{parasitic}$$

where:
$Q_{out}$ = heat rate (Btu/hr) to the hot process
$W_{parasitic}$ = electrical power (Btu/hr) required to pump water and acid through the CHP and heat exchangers The industrial chemical heat pump can be optimized for its particular application, i.e., the process temperature requirements, the condenser temperature available and the waste heat source temperature. Typical values for the ratio of process heat delivered to the waste heat supplied vary from 0.5 to 0.1. Thus, the waste heat supply must be from two to ten times larger than the process needs. Note that temperatures as high as 380° F. can be produced but at substantially reduced $COP_e$ and heat ratio. The performance of the sulfuric acid industrial chemical heat pump at a waste heat source inlet temperature of 210° F. can achieve process temperatures as high as 320° F. with a corresponding $COP_e$ of 5 and a heat ratio of 0.1. These performance calculations are based upon utilization of the same waste heat source to drive the evaporator and heat the concentrated acid. However, if higher temperature waste heat is available to heat the concentrated acid (e.g., exhaust heat stream) in addition to the warm water waste heat source, significantly higher temperature process heat could be produced.

The advantages of the industrial heat pump discussed above should be apparent. First and foremost, waste process heat that is otherwise dumped to the environment can be utilized in an efficient and economical manner by pumping the waste heat up to a usable temperature. If desired, a plurality of industrial heat pumps can be serially employed to sequentially pump the waste heat rejected by the initial process to successively higher temperatures until either the heat pumping stops due to equilibrium or no additional process requirements exist. Preliminary calculations at present-day energy costs indicate that assuming the waste heat is free, the cost of capital equipment can be paid back over a two-year period based on present-day energy costs. As a consequence, the industrial heat pump constitutes a conservation device as well as an ecologically sound system since the waste heat ultimately dumped back into the environment surrounding the original process is lower.

Many modifications can be made to the industrial chemical heat pump without departing from the broad concepts disclosed. For example, a direct contact device can be employed in the condenser as a substitute for the heat exchanger 212 to condense the water vapor produced in the generator. Similarly, a heat exchanger can be utilized in the evaporator if the waste heat source is not sufficiently pure water. Although the capital costs of systems employing condenser and evaporator heat exchangers will be higher, improved performance through the use of less parasitic power can be achieved.

To reiterate, the main advantages of the heat pump and storage system are a high energy storage density, the ability of the system to function as a heat pump at temperatures that are usable for building heating and cooling loads or industrial processes, and the utilization of readily available chemicals, water and sulfuric acid. Sulfuric acid has been used for many years in thousands of industrial applications such as petroleum refining, car batteries, pharmaceuticals, and food processing, only to name a few, and is produced in greater quantities than any other chemical by a considerable margin. As a result, much is known about handling, use, and storage of the acid; and a wealth of materials compatibility data is available. Numerous plastics are known to withstand exposure to sulfuric acid for long periods of time, which raises expectations of low tankage costs. Portions of the system that are exposed to hot acid will require more expensive materials, but numerous moderate-cost materials are available, and system component sizes can be minimized. The high volumes of production of sulfuric acid and the almost limitless supply of its constituent chemicals are responsible for its extremely low cost of around $0.02/lbm for 93 weight percent acid. Additionally, significant cost increases are not expected in the future. Moreover, increased sulfuric acid demand would complement air quality control programs by providing a market for byproducts of stack gas scrubbing and other processes.

The present invention has been described in relation to its broad concepts as well as a preferred embodiment. One of ordinary skill after reading the foregoing specification will be able to effect various changes, substitutions of equivalents, and other alterations to the system without departing from the broad concepts disclosed herein. For example, various primary energy sources can be employed to separate the acid and water, such as natural gas, electrical energy and industrial process waste heat. Additionally, the system can be operated at higher pressures and temperatures so that, for example, heat can be pumped from a medium-grade heat source up to high temperatures, on the order of 800° F. or higher for industrial process use. Other components can also be added to the system. For example, where a high-grade heat source is employed to supply heat to the separator and produce water vapor in the form of high-pressure steam, a turbine can be interposed in the vapor transfer line between the separator and the condenser through which the steam is expanded. The turbine output can be employed, for example, to drive an electrical generator. The foregoing examples represent only a few of the many alterations that can be made to the system. It is therefore intended that the scope of Letters Patent granted hereon be limited only by the definition contained in the appended claims and equivalents thereof.

The embodiments of the invention in which an exclusive property or privilege is claimed are defined as follows:

1. An energy storage and heat pump system comprising:

acid storage means for storing an aqueous sulfuric acid solution at atmospheric pressure, generator means for removing water vapor from an aqueous sulfuric acid solution, condenser means for condensing water vapor, and conduit means for placing said generator means in vapor communication with said condenser means, absorber means for absorbing water vapor into a sulfuric acid solution, evaporator means for producing water vapor from water, and conduit means placing said evaporator means and said absorber means in vapor communication, said generator means, condenser means, absorber means and evaporator means being maintained at a pressure other than atmospheric, means for transferring sulfuric acid solution from said generator means to said acid storage means, means for supplying sulfuric acid solution to and removing sulfuric acid solution from said absorber means, said sulfuric acid solution being supplied to said absorber means from said acid storage means, said acid being stored in concentrated form in said storage means, the heat of dilution and the heat of condensation being released upon the absorption of water onto said acid solution in said absorber, said acid solution when concentrated in said generator means and stored in said storage means thereby storing energy until released in said absorber means, first heat transfer means for supplying heat to the sulfuric acid solution for evaporation of water vapor therefrom in said generator means, second heat transfer means for removing heat from water vapor present in said condenser means, third heat transfer means for supplying heat to water in said evaporator means, means for removing water from said condenser means, and means for supplying water to said evaporator means.

2. The system of claim 1 further comprising water storage means for storing water at atmospheric pressure, said means for removing water from said condenser means being coupled in liquid communication with said water storage means, said means for supplying water to said evaporator means being coupled in liquid communication with said water storage means.

3. The system of claim 1 wherein said means for transferring acid solution between said acid storage means and said generator means comprises a first liquid conduit placing said acid storage means in fluid communication with said generator means, said first heat transfer means comprising a heat exchanger in heat exchange relationship with said first liquid conduit, said heat exchanger being operably coupled to a source of heat.

4. The system of claim 3 further comprising:
   means for placing said heat exchanger in heat transfer relationship with a heating load.

5. The system of claim 3 wherein said means for removing acid solution from said absorber means is coupled to said first liquid conduit upstream from said heat exchanger.

6. The system of claim 1 wherein said generator means has means therein for aiding in the separation of acid vapor from water vapor produced therein before said acid vapor enters said conduit means between said generator means and said condenser means.

7. The system of claim 1 wherein said absorber means has means therein for increasing the liquid-vapor contact area.

8. The system of claim 7 wherein said means for increasing the liquid vapor contact area comprises packing.

9. The system of claim 8 wherein said means for supplying acid to said absorber means includes means for distributing said acid over the top of said packed column.

10. The system of claim 1 wherein said second heat transfer means is coupled in heat transfer relationship to a heating load.

11. The system of claim 1 wherein said second heat transfer means is coupled in heat transfer relationship with an external heat sink.

12. The system of claim 1 wherein said means for removing acid solution from said absorber means is in fluid communication with said acid storage means.

13. The system of claim 1 wherein said third heat transfer means is coupled in heat transfer relationship to a building cooling load.

14. The system of claim 1 wherein said third heat transfer means is coupled in heat transfer relationship to an external heat source.

15. The system of claim 1 wherein the water present in said evaporator means contains a minor amount of sulfuric acid to lower the freezing point of said water.

16. The system of claim 1 wherein said source of heat comprises a solar collector.

17. The system of claim 1 wherein said source of heat comprises industrial waste heat.

18. The system of claim 1 wherein said source of heat is derived from electrical energy.

19. The system of claim 1 wherein said generator means, said absorber means, said condenser means and said evaporator means are maintained at a pressure in the range of from $10^{-7}$ to $3.2 \times 10^3$ p.s.i.a.

20. The system of claim 19 wherein said pressure is near vacuum.

21. The system of claim 1 wherein said means for transferring sulfuric acid solution from said generator means to said acid storage means further comprises means for also supplying sulfuric acid solution from said acid storage means to said generator means.

* * * * *